United States Patent
Zhang et al.

(10) Patent No.: US 9,735,817 B2
(45) Date of Patent: Aug. 15, 2017

(54) MULTI-CHANNEL ARRAY DISTORTION COMPENSATION APPARATUS AND METHOD

(71) Applicant: HUAWEI TECHNOLOGIES CO., LTD., Shenzhen (CN)

(72) Inventors: Miaomiao Zhang, Shenzhen (CN); Guangjian Wang, Chengdu (CN); Jia He, Chengdu (CN); Rong Wen, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/226,244

(22) Filed: Aug. 2, 2016

(65) Prior Publication Data
US 2016/0344434 A1    Nov. 24, 2016

Related U.S. Application Data
(63) Continuation of application No. PCT/CN2015/072743, filed on Feb. 11, 2015.

(30) Foreign Application Priority Data
Mar. 27, 2014   (CN) .......................... 2014 1 0120919

(51) Int. Cl.
  H03D 1/04    (2006.01)
  H04B 1/12    (2006.01)
  (Continued)

(52) U.S. Cl.
  CPC ............. *H04B 1/12* (2013.01); *H04B 1/1027* (2013.01); *H04B 7/0617* (2013.01); *H04B 17/11* (2015.01);
  (Continued)

(58) Field of Classification Search
  CPC ....... H04B 17/318; H04B 1/1027; H04B 1/12
  (Continued)

(56) References Cited

U.S. PATENT DOCUMENTS
2003/0080985 A1* 5/2003 Kagawa .................. G09G 1/00
                                                     345/698

FOREIGN PATENT DOCUMENTS
| CN | 1189022 A | 7/1998 |
| CN | 1350365 A | 5/2002 |
(Continued)

OTHER PUBLICATIONS
International Search Report dated Apr. 29, 2015 in corresponding International Patent Application No. PCT/CN2015/072743.
(Continued)

*Primary Examiner* — Leila Malek
(74) *Attorney, Agent, or Firm* — Staas & Halsey LLP

(57) ABSTRACT

The present invention provides a multi-channel array distortion compensation apparatus and method. The apparatus determines, according to a status of a first indication signal, whether to trigger a signal compensation operation; determines, according to a status of a second indication signal, a first adjustment condition is met, compares power of a received signal with a power threshold, and if the power of the received signal is greater than the threshold power, compensates the received signal according to a first adjustment factor; and if the status of the second indication signal does not meet the first adjustment condition, determines the status of the second indication signal meets a second adjustment condition, performs auxiliary compensation according to a second adjustment factor. By compensating signal distortion caused by chip stacking for a received signal, this reduces costs for implementing a multi-channel array system without the need to increase system complexity.

8 Claims, 7 Drawing Sheets

(51) Int. Cl.
  *H04B 7/06* (2006.01)
  *H04B 17/318* (2015.01)
  *H04B 1/10* (2006.01)
  *H04B 17/11* (2015.01)
  *H04B 17/12* (2015.01)
  *H04B 17/13* (2015.01)
(52) U.S. Cl.
  CPC ........... *H04B 17/318* (2015.01); *H04B 17/12* (2015.01); *H04B 17/13* (2015.01)
(58) Field of Classification Search
  USPC .................. 375/346, 316, 347, 348; 382/103
  See application file for complete search history.

(56) References Cited

FOREIGN PATENT DOCUMENTS

CN    101594327 A    12/2009
CN    102088427 A     6/2011

OTHER PUBLICATIONS

International Search Report mailed Apr. 29, 2015 in corresponding International Application No. PCT/CN2015/072743.

* cited by examiner

MULTI-CHANNEL ARRAY DISTORTION COMPENSATION APPARATUS AND METHOD

CROSS-REFERENCE TO RELATED APPLICATIONS

This application is a continuation of International Application No. PCT/CN2015/072743, filed on Feb. 11, 2015, which claims priority to Chinese Patent Application No. 201410120919.4, filed on Mar. 27, 2014, both of which are incorporated herein by reference in their entireties.

TECHNICAL FIELD

Embodiments of the present invention relate to communications technologies, and in particular, to a multi-channel array distortion compensation apparatus and method.

BACKGROUND

Technological and social development will bring a surge in mobile and wireless traffic, and a decade later, mobile broadband traffic will reach a thousand times more than that of today. In the prior art, it is difficult to meet such a requirement by improving spectrum efficiency, and therefore usage of large bandwidth of a high frequency band has become an inevitable trend. To meet a requirement for rapid growth in mobile data rates in the future, a millimeter-wave band, as a most promising technology, has advantages of a short wavelength and a wide frequency band. However, compared with microwave communications, a millimeter wave is more susceptible to atmospheric absorption, for example, of rain and air, resulting in a problem of a large free-space loss in a transmission path. More studies show that large array antenna and beam alignment technologies are desired to resolve the foregoing problem. To be able to implement the large array antenna and beam alignment technologies, commercial chips may be used for intelligent stacking. Currently, because device errors are inherent in individual chips, it is difficult to determine a phase relationship output by a phase-locked loop. As a result, phase noise output by multiple channels is independent, and overall characteristics of synthesized phase noise have changed, which not only results in a phase offset, but also brings amplitude fluctuation and amplitude varies with time. Local phase noise of each of the multiple modules is independent, resulting that a beam deviates from a specified value and that an irregular shake occurs in spatial beam synthesis, causing interference. Therefore, signal distortion compensation needs to be performed for a received signal. Otherwise, symbol synchronization and equalization may be affected, resulting in an increased bit error rate of a system.

Because all chips have different sources after multiple chips are stacked, current common phase noise immunity algorithms are ineffective for phase noise of different sources. Therefore, to enable gain compensation for multiple channels, a multi-channel digital automatic gain control method and control apparatus is provided in the prior art. When there are two or more than two channel circuits and a gain amplifier corresponding to each of the channel circuits, a digital signal processing (DSP) is used to make each channel output operate according to multiple selectable instructions and parameters stored in the DSP, and a control measure iteration algorithm is used to ensure that output gains of multiple channels are best controlled.

However, by using the solution of the prior art, the output gains of multiple channels have to operate according to the multiple selectable instructions and parameters stored in the DSP. The whole solution requires multiple single-chip microcomputer chips and complex control, which increases costs and difficulty for implementing the solution.

SUMMARY

The present invention provides a multi-channel array distortion compensation apparatus and method, so as to compensate a received signal.

A first aspect of the present invention provides a multi-channel array distortion compensation apparatus, comprising a processor and a non-transitory computer readable medium connected to the processor, and having stored thereon instructions that, when executed, cause the processor to:

determine, according to a status of a first indication signal, trigger a signal compensation operation; determine, according to a status of a second indication signal, a first adjustment condition is met; compare power of a received signal with a power threshold; and if the power of the received signal is greater than the threshold power, compensate the received signal according to a first adjustment factor; where if the status of the second indication signal does not meet the first adjustment condition, determine the status of the second indication signal meets a second adjustment condition, and compensate the received signal according to a second adjustment factor.

With reference to the first aspect, in a first possible implementation manner, the processor is configured to determine the status of the first indication signal is greater than 0, trigger the signal compensation operation; check the status of the second indication signal, where if the second indication signal is not received, the first adjustment condition is met; set a period and the threshold power according to a modulation manner and a variable gain amplifier (VGA) property; measure the power of the received signal according to the period and determine whether the power of the received signal is greater than the threshold power;

if the power of the received signal is greater than the threshold power, multiply the received signal by the first adjustment factor; and if the status of the second indication signal meets the second adjustment condition, search for a pilot location according to the second indication signal and select a pilot signal for periodical power measurement, with a power measure denoted by P1, measure power of a local pilot signal periodically, with a power measure denoted by P2, and compensate the received signal according to the second adjustment factor; where the second adjustment factor is obtained by using the following formula:

$$\beta = \frac{1}{\sqrt{P1/(P2 \times P)}},$$

where

β is the second adjustment factor, and P is the threshold power.

With reference to the first possible implementation manner of the first aspect, in a second possible implementation manner, the second adjustment condition is that the status of the second indication signal is greater than 0 and not equal to 1; or the second adjustment condition is that the status of the second indication signal is greater than 0.

With reference to the second possible implementation manner of the first aspect, in a third possible implementation manner, the processor is further configured to: when the second adjustment condition is that the status of the second indication signal is greater than 0 and not equal to 1, determine, after the compensation module compensates the received signal according to the second adjustment factor, the status of the second indication signal is 1, stop compensation, until a next time when the status of the second indication signal is greater than 0.

A second aspect of the present invention provides a multi-channel array distortion compensation method, including:

determining, according to a status of a first indication signal, trigger a signal compensation operation;

determining, according to a status of a second indication signal, a first adjustment condition is met, comparing power of a received signal with a power threshold, and if the power of the received signal is greater than the threshold power, compensating the received signal according to a first adjustment factor; and if the status of the second indication signal does not meet the first adjustment condition, determining the status of the second indication signal meets a second adjustment condition, compensating the received signal according to a second adjustment factor.

With reference to the second aspect, in a first possible implementation manner, the determining, according to the status of the first indication signal, whether to trigger a signal compensation operation includes:

determining the status of the first indication signal is greater than 0, triggering the signal compensation operation;

the determining, according to a status of a second indication signal, a first adjustment condition is met includes:

checking the status of the second indication signal, where if the second indication signal is not received, the first adjustment condition is met;

the comparing power of a received signal with threshold power, and if the power of the received signal is greater than the threshold power, compensating the received signal according to a first adjustment factor includes:

setting a period and the threshold power according to a modulation manner and a variable gain amplifier (VGA) property; and measuring the power of the received signal according to the period, determining the power of the received signal is greater than the threshold power, multiplying the received signal by the first adjustment factor; and the determining the status of the second indication signal meets a second adjustment condition, compensating the received signal according to a second adjustment factor includes:

if the status of the second indication signal meets the second adjustment condition, searching for a pilot location according to the second indication signal and selecting a pilot signal for periodical power measurement, with a power measure denoted by P1, measuring power of a local pilot signal periodically, with a power measure denoted by P2, and compensating the received signal according to the second adjustment factor; where the second adjustment factor is obtained by using the following formula:

$$\beta = \frac{1}{\sqrt{P1/(P2 \times P)}},$$

where

β is the second adjustment factor, and P is the threshold power.

With reference to the first possible implementation manner of the second aspect, in a second possible implementation manner, the second adjustment condition is that the status of the second indication signal is greater than 0 and not equal to 1; or the second adjustment condition is that the status of the second indication signal is greater than 0.

With reference to the second possible implementation manner of the second aspect, in a third possible implementation manner, when the second adjustment condition is that the status of the second indication signal is greater than 0 and not equal to 1, after the updating a pilot location in each frame of the received signal according to the second adjustment factor, the method further includes:

determining the status of the second indication signal is 1, stopping compensation, until a next time when the status of the second indication signal is greater than 0.

According to the multi-channel array distortion compensation apparatus and method provided by the embodiments of the present invention, the multi-channel array distortion compensation apparatus determines, according to a status of a first indication signal, whether to trigger a signal compensation operation; if determining to trigger the signal compensation operation, determines, according to a status of a second indication signal, whether a first adjustment condition is met, if the first adjustment condition is met, compares power of a received signal with threshold power, and if the power of the received signal is greater than the threshold power, compensates the received signal according to a first adjustment factor and otherwise waits for an indication signal; and if the status of the second indication signal does not meet the first adjustment condition, determines whether the status of the second indication signal meets a second adjustment condition, and if the status of the second indication signal meets the second adjustment condition, performs auxiliary compensation according to a second adjustment factor. It is implemented by compensating a received signal that a system only needs to select and use the most common linear interpolation and amplitude interpolation algorithms to compensate signal distortion caused by chip stacking, without the need to increase complexity of a phase noise immunity algorithm, which reduces costs for implementing a multi-channel array system.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figure 1:
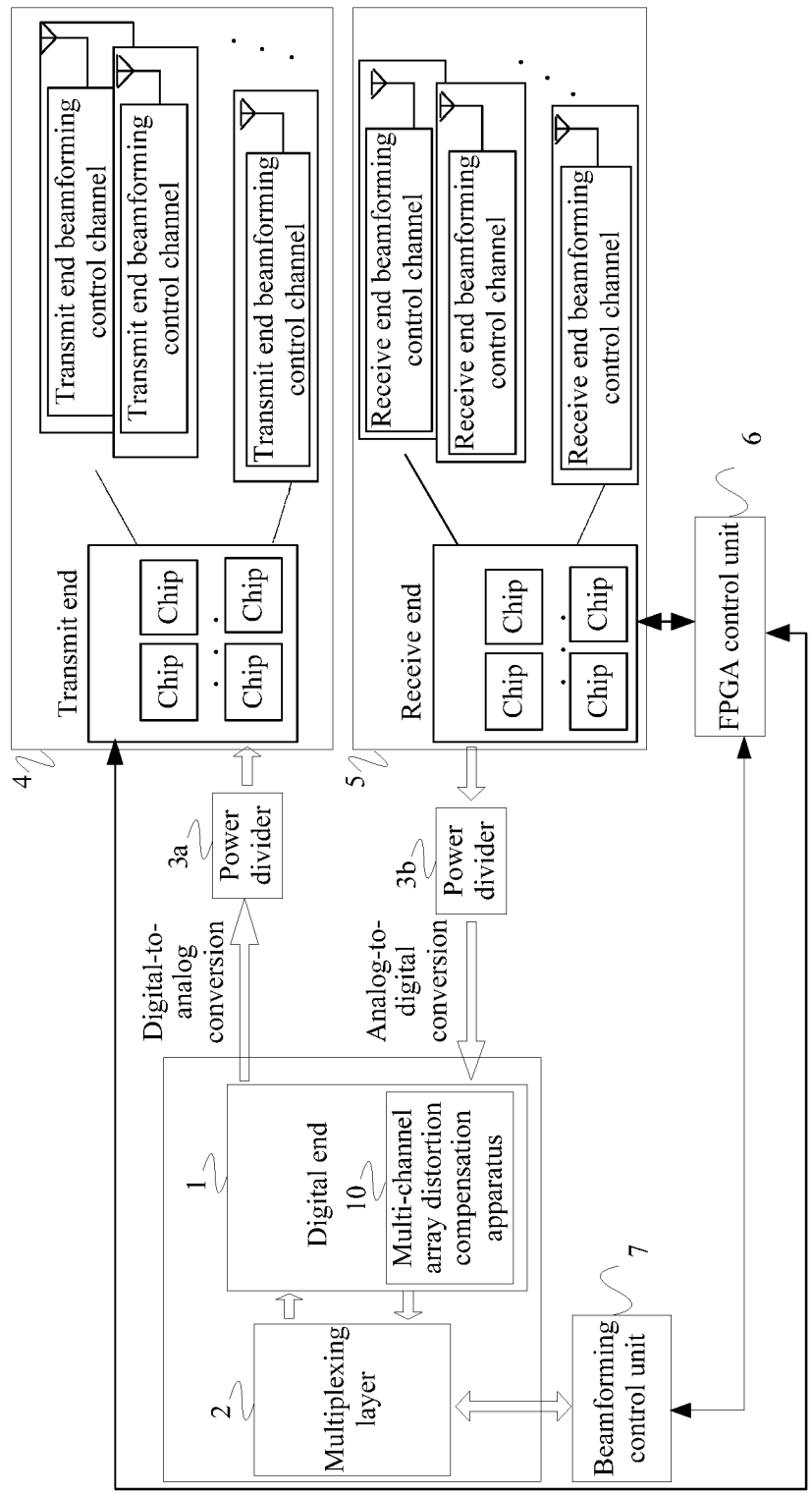
FIG. 1 is a schematic diagram of a multi-chip stacking structure of a transmit end and a receive end according to an embodiment of the present invention.

The embodiments of the present invention use existing commercial chips for intelligent stacking, to implement large-array long-distance transmission. Multi-chip stacking leads to different phase noise, resulting in signal distortion. The embodiments of the present invention provide a multi-channel array distortion compensation method and apparatus, which can rapidly implement signal compensation without increasing complexity of a phase noise immunity algorithm. FIG. 1 is a schematic diagram of a multi-chip stacking structure of a transmit end and a receive end according to an embodiment of the present invention.

Referring to FIG. 1, at a transmit end 4, $N_t$ ($N_t \geq 1$) chips are used for intelligent stacking (intelligent stacking is not simply placing multiple chips together, but rather a spacing between and placement of the chips both result in a different main lobe and side lobe of a directivity pattern), and to-be-sent data is sent by using multiple transmit end beamforming control channels. At a receive end 5, data is received by using multiple receive end beamforming control channels, and $N_r$ ($N_r \geq 1$) chips are used for intelligent stacking and expands signal array elements to ($N_t \times K$, $N_r \times K$), where K represents a quantity of array elements corresponding to each chip; power distribution is performed for the received data by using a power divider 3b, and then the received data is sent to a multi-channel array distortion compensation apparatus 10 after analog-to-digital conversion. The multi-channel array distortion compensation apparatus 10 is a newly added apparatus in the embodiment of the present invention, which may be integrated together with another device of a digital end 1, or may be a separate physical device. The embodiment of the present invention imposes no limitation to a specific form of the multi-channel array distortion compensation apparatus 10. A purpose of the multi-channel array distortion compensation apparatus 10 is to implement, by compensating a received signal, that a system only needs to select and use the most common linear interpolation and amplitude interpolation algorithms to compensate signal distortion caused by chip stacking, without the need to increase complexity of a phase noise immunity algorithm, which reduces costs for implementing a multi-channel array system. After compensating the received signal, the multi-channel array distortion compensation apparatus 10 sends the signal to a multiplexing layer 2 for subsequent processing.

At a radio frequency end, a beam direction change is implemented by controlling an angle corresponding to a phase shifter of each array element, and a size of the angle is determined according to a value of bit width selected by the phase shifter. For example, the bit width is 2 bits, and only $2^2$ phase values, 0°, 90°, 180°, and 270°, can be selected, and the phase shifter selects one of the four angles. Selection of a phase shifter angle is decided by a beamforming control unit 7 corresponding to the transmit end and the receive end. Specifically, the beamforming control unit 7 uses placement and a direction angle of a chip array element jointly to estimate a weighted value of the phase shifter, where the direction angle is fed back by the multiplexing layer 2 to the beamforming control unit 7. A field programmable gate array (FPGA) control unit 6 writes a control statement to control the phase shifter to change the weighted value. In specific implementation, one of the following situations may be applied according to system needs: online real-time update, update controlled by a feedback indication signal, table search, and a codebook. A feedback signal is generated according to system needs, to control a beamforming control unit 7 to update the weighted value of the phase shifter. Update timing may be once a frame, or may be once a subframe. A specific update manner is set according to system needs, which is not limited herein.

Figure 2:
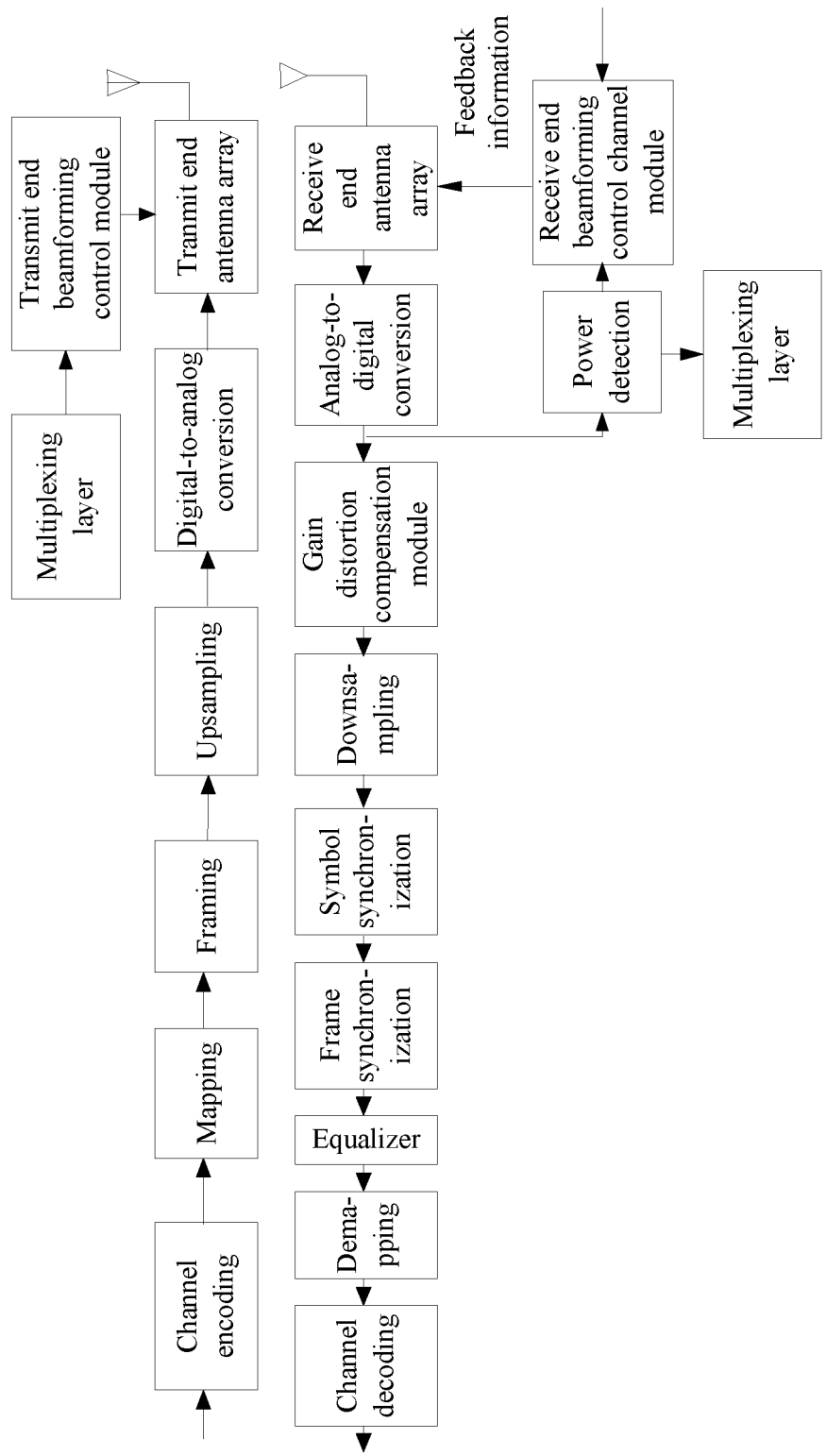
FIG. 2 is a schematic diagram of a working procedure of a digital end according to an embodiment of the present invention.

FIG. 2 is a schematic diagram of a working procedure of a digital end (Modem) according to an embodiment of the present invention. Referring to FIG. 2, a processing process at a transmit end is as follows: A source signal is encoded by means of channel encoding and a signal sampling rate is increased to a system-required sampling rate by using a mapping module, a framing module, and an upsampling module. Next, a digital signal is converted to an analog signal by using a DAC module. Finally, a direction angle corresponding to each array element is estimated by using a transmit end beam control unit, to control a phase shifter of a transmit antenna array to select a value, and the signal is sent out.

A processing process at a receive end is as follows: At an initial phase, information fed back by the multiplexing layer and placement of a chip array element of the receive end are used jointly to estimate a direction of a receive end array element and adjust the direction to control an antenna to receive important information, and analog-to-digital conversion processing is performed on a received signal to convert an analog signal into a digital signal; next, power of the digital signal is detected and an antenna adjustment angle is estimated and fed back to the multiplexing layer and the transmit end beam control unit for continuous fine adjustment of the antenna angle; afterward, gain distortion compensation is performed for the digital signal based on a multi-channel array distortion compensation method and apparatus provided by the following embodiments of the present invention.

Because it is difficult to make all chips share a same source after multiple chips are stacked, current common phase noise immunity algorithms (linear interpolation and amplitude interpolation) are ineffective for phase noise of different sources. Therefore, the embodiments of the present invention provide a multi-channel array distortion compensation method and apparatus, so as to resolve a problem of signal distortion caused by chip stacking, without the need to increase complexity of a phase noise immunity algorithm.

Referring FIG. 1, this embodiment provides a multi-channel array distortion compensation apparatus. The multi-channel array distortion compensation apparatus may be provided at a digital end (Modem) of a node device, and by using a power combiner, obtains a signal received by the receive end and performs compensation processing for the received signal. Functions of the multi-channel array distortion compensation apparatus are described by using the following embodiments.

Figure 3:
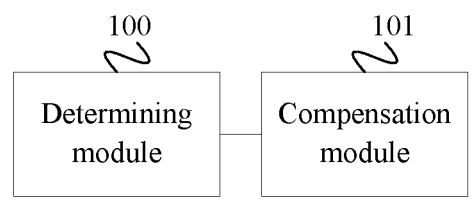
FIG. 3 is a schematic structural diagram of a multi-channel array distortion compensation apparatus according to an embodiment of the present invention.

FIG. 3 is a schematic structural diagram of a multi-channel array distortion compensation apparatus according to an embodiment of the present invention. Referring to FIG. 3, the multi-channel array distortion compensation apparatus 10 includes a determining module 100 and a compensation module 101.

The determining module 100 is configured to determine, according to a status of a first indication signal, whether to trigger a signal compensation operation; and further configured to: if determining to trigger the signal compensation operation, determine, according to a status of a second indication signal, whether a first adjustment condition is met, and if the first adjustment condition is met, compare power of a received signal with threshold power.

The compensation module 101 is configured to: if the power of the received signal is greater than the threshold power, compensate the received signal according to a first adjustment factor.

The determining module 100 is further configured to: if the status of the second indication signal does not meet the first adjustment condition, determine whether the status of the second indication signal meets a second adjustment condition.

The compensation module 101 is further configured to: if the status of the second indication signal meets the second adjustment condition, compensate the received signal according to a second adjustment factor.

In the multi-channel array distortion compensation apparatus according to this embodiment, a determining module determines, according to a status of a first indication signal, whether to trigger a signal compensation operation; if determining to trigger the signal compensation operation, determines, according to a status of a second indication signal, whether a first adjustment condition is met, if the first adjustment condition is met, compares power of a received signal with threshold power, and if the power of the received signal is greater than the threshold power, compensates the received signal according to a first adjustment factor and otherwise waits for an indication signal; and if the status of the second indication signal does not meet the first adjustment condition, the determining module determines whether the status of the second indication signal meets a second adjustment condition, and if the status of the second indication signal meets the second adjustment condition, performs auxiliary compensation according to a second adjustment factor. It is implemented by compensating a received signal that a system only needs to select and use the most common linear interpolation and amplitude interpolation algorithms to compensate signal distortion caused by chip stacking, without the need to increase complexity of a phase noise immunity algorithm, which reduces costs for implementing a multi-channel array system.

Further, the determining module 100 is specifically configured to determine whether the status of the first indication signal is greater than 0, and if the status of the first indication signal is greater than 0, trigger the signal compensation operation; further specifically configured to check the status of the second indication signal, where if the second indication signal is not received, the first adjustment condition is met; further specifically configured to set a period and the threshold power according to a modulation manner and a variable gain amplifier (VGA) property; and further specifically configured to measure the power of the received signal according to the period and determine whether the power of the received signal is greater than the threshold power.

The determining module 100 can set different power adjustment thresholds according to different modulation manners and VGA properties. For example, the threshold power is relational to a quantity of ADC bits and a peak-to-average ratio of a modulated signal. A calculation method is as follows: assuming that the ADC has 9 bits, with 1 symbol bit, 2 integer bits, and 6 decimal bits, then a range of values that the ADC can represent is −3.9375 to 3.9375. A peak-to-average ratio of 16QAM is 6.1 dB. With a margin of 2 dB considered, a power threshold value is obtained by decreasing maximum power that the ADC represents by 8.1 dB. 10 lg(3.9375^2/x)=8.1, where x=2.4013.

The compensation module 101 is specifically configured to: if the power of the received signal is greater than the threshold power, multiply the received signal by the first adjustment factor.

The compensation module 101 is further specifically configured to: if the status of the second indication signal meets the second adjustment condition, search for a pilot location according to the second indication signal and select a pilot signal for periodical power measurement, with a power measure denoted by P1, measure power of a local pilot signal periodically, with a power measure denoted by P2, and compensate the received signal according to the second adjustment factor.

Specifically, processing at this phase is performed only at a pilot location of each frame, and in other time, the adjustment factor is not updated but stays the same as the previous value. After the receive end is enabled to receive data, the second adjustment factor may be adjusted continuously according to the pilot signal and the local pilot signal. Therefore, compensating the received signal according to the second adjustment factor can be finer than that according to the fixed first adjustment factor.

The second adjustment factor is obtained by using the following formula:

$$\beta = \frac{1}{\sqrt{P1/(P2 \times P)}},$$

where

β is the second adjustment factor, and P is the threshold power.

Figure 4:
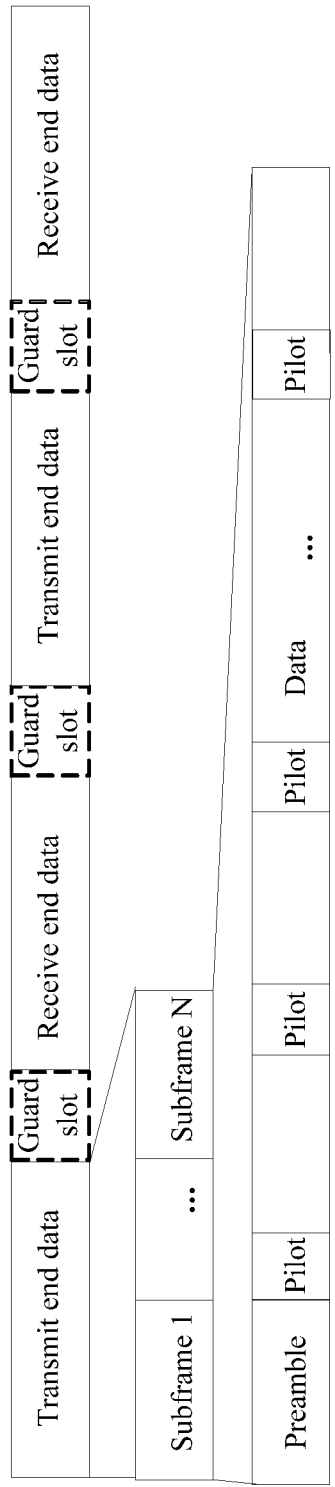
FIG. 4 is a schematic diagram of a frame structure according to an embodiment of the present invention.

It should be noted that FIG. 4 is a schematic diagram of a frame structure according to an embodiment of the present invention. Referring to FIG. 4, local pilot data is inserted into transmit data periodically with an insertion period varying with the system, and a quantity of inserted pieces of local pilot data is set according to system needs. The local pilot data goes through a same channel as the transmit data, and a signal inserted at a pilot location is known. Therefore, in this embodiment, the known signal inserted at the pilot location is named a local pilot signal. After the transmit data is transmitted through a channel, the pilot location may change. As a result, a signal at the pilot location after channel transmission is unknown. Therefore, in this embodiment, a signal at the pilot location of received data is named a pilot signal. The pilot signal (the signal received at the pilot location) and the local pilot signal may be used to estimate the second adjustment factor for compensating data information. However, it should be noted that, a period of pilot data insertion is different from a period of compensation according to the second adjustment factor, where the period of compensation according to the second adjustment factor needs to be set according to system needs.

Further, the second adjustment condition is that the status of the second indication signal is greater than 0 and not equal to 1.

The second adjustment condition is that the status of the second indication signal is greater than 0.

Preferably, the determining module 100 is further configured to: when the second adjustment condition is that the status of the second indication signal is greater than 0 and not equal to 1, determine, after the compensation module 101 compensates the received signal according to the second adjustment factor, whether the status of the second indication signal is 1, and if yes, stop compensation, until a next time when the status of the second indication signal is greater than 0.

Further, the foregoing first indication signal may be a Reset_ID signal fed back by a digital end. The Reset_ID signal has the following characteristics: the Reset_ID signal is generated by a system timing control module for a purpose of controlling when to enable the receive end, which may be also understood as an on flag signal, where the receive end is generally enabled in advance in a TDD system; a status of the Reset_ID signal is 0 or 1; the status of the Reset_ID signal being equal to 1 indicates that the receive end has started to receive data. The second indication signal may be an automatic flow word (Automatic Flow Word, AFW for short)_ID signal fed back by the digital end. The AFW_ID signal has the following characteristics: the AFW_ID signal is generated by a frame synchronization module for a purpose of indicating a quantity of remaining subframes in a current frame, which may be understood as a flow identifier. In a TDD system, the AFW_ID signal has two meanings: a flag that the system has completed synchronization estimation, and flow control. In an FDD system, the AFW has only one meaning: a flag that the system has completed synchronization estimation.

The multi-channel array distortion compensation apparatus may use the reset ID signal and the AFW_ID signal fed back by the digital end for coarse adjustment or fine adjustment. When the reset_ID signal is 1, it indicates that the receive end has started to receive wanted data, and the AFW_ID signal indicates that the frame synchronization module has completed a frame synchronization operation. Moreover, the AFW_ID signal updates information according to a status of the frame synchronization module. For example, the AFW_ID signal being greater than 0 for the first time indicates that the frame synchronization module has just implemented frame synchronization. When the status of the reset_ID signal is greater than 0, the reset_ID signal indicates that the receive end has started to be enabled to receive wanted data; and the AFW_ID signal indicates that the frame synchronization module has completed a frame synchronization operation. Certainly, another indication signal may also control the multi-channel array distortion compensation apparatus to perform coarse adjustment or fine adjustment. The embodiment of the present invention does not limit which feedback indication signals can control the multi-channel array distortion compensation apparatus to perform compensation processing.

Further, in a TDD mode, data is sent and received at a same frequency band, and data sending or data receiving is controlled according to different time. In this case, the AFW_ID signal has two meanings: a frame synchronization flag and a flow control table identifier. The status of the AFW_ID presents a quantity of remaining subframes in a current frame structure. The status of the AFW_ID signal is so determined: being greater than 0 indicates that the receive end has completed a frame synchronization process and the multi-channel array distortion compensation apparatus is controlled to enter fine adjustment; AFW_ID=1 indicates that only the last subframe has remained in the current frame structure and the multi-channel array distortion compensation apparatus is controlled to stop adjustment. In an FDD mode, data is sent and received at different frequency bands, where the transmit end always sends data and the receive end always receives data, without interfering with each other. In this case, the AFW_ID is only a flag used to indicate frame synchronization, and the AFW_ID signal is used to control the multi-channel array distortion compensation apparatus to enter fine adjustment. Therefore, the AFW_ID signal is different for the TDD mode and the FDD mode, and whether a mode is TDD or FDD needs to be considered before the solution is specifically implemented.

For the TDD mode, the signal status may be divided into three phases: status 1: whether a wanted signal has arrived is determined by using the reset_ID signal; status 2: the AFW_ID signal is greater than 0 and not 1; and status 3: the AFW_ID signal is 1.

For the FDD mode, the signal status may be divided into two phases: status 1: whether a wanted signal has arrived is determined by using the reset_ID signal; and status 2: the AFW_ID signal is greater than 0, where whether the AFW_ID is 1 does not need to be determined.

In both the TDD mode and the FDD mode, the receive end receives some unwanted data at the beginning, and needs to wait for arrival of the wanted signal at the first phase. The TDD mode is used as an example for description. After the wanted signal arrives, the receive end starts coarse adjustment to compensate the received signal, and continues to determine the signal status, and when status 2 occurs, switches to fine adjustment to compensate the received signal until status 3 occurs, and starts the adjustment again when a next frame arrives.

Figure 5:
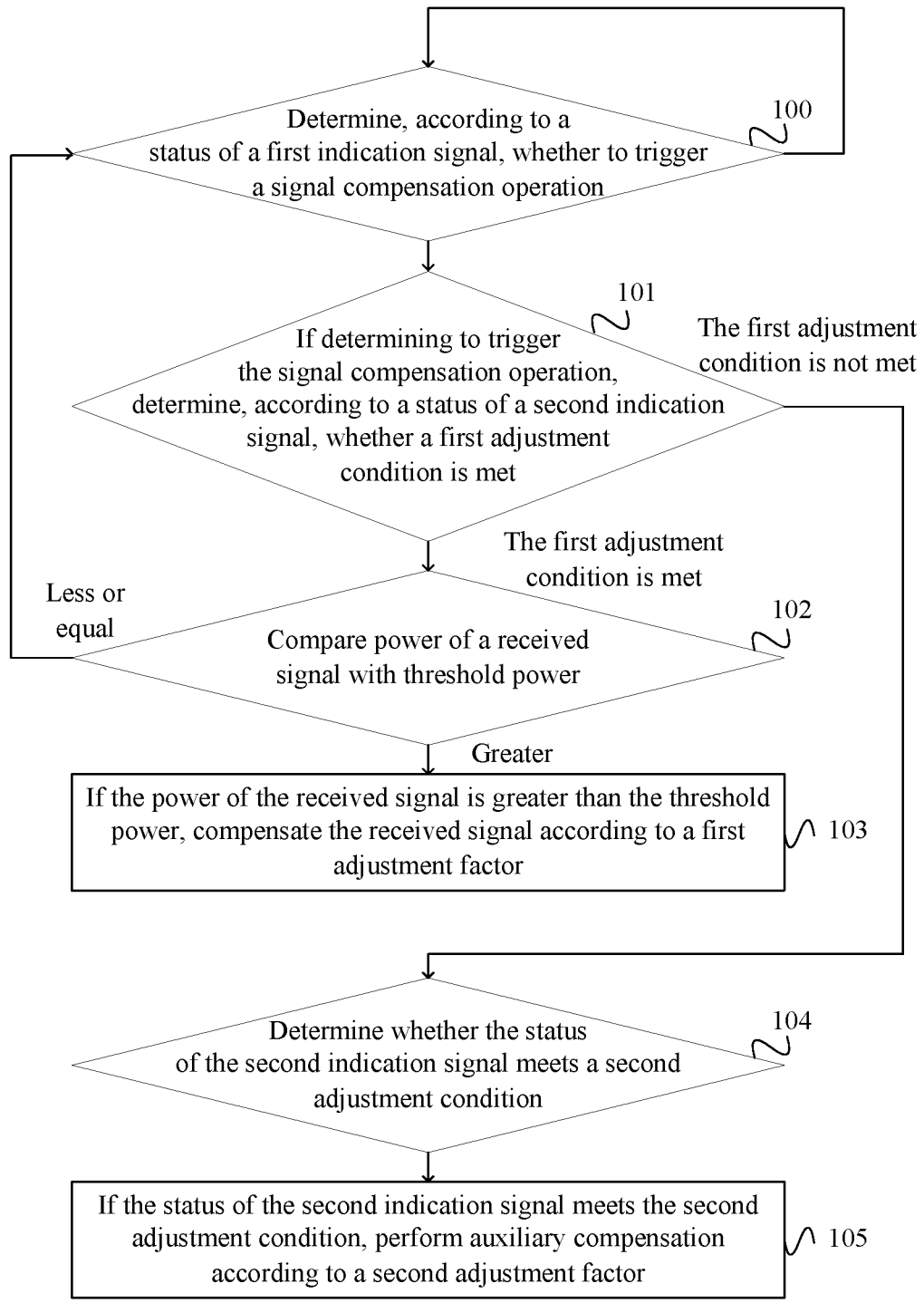
FIG. 5 is a schematic flowchart of a distortion compensation method for a multi-channel array system according to an embodiment of the present invention.

FIG. 5 is a schematic flowchart of a distortion compensation method for a multi-channel array system according to an embodiment of the present invention. This embodiment is executed by a multi-channel array distortion compensation apparatus. Specifically, the multi-channel array distortion compensation apparatus may be provided at a node having receiving and sending functions on a network, for example, at a base station or a relay device. Referring to FIG. 5, the method includes the following steps:

Step 100: Determine, according to a status of a first indication signal, whether to trigger a signal compensation operation.

Step 101: If determining to trigger the signal compensation operation, determine, according to a status of a second indication signal, whether a first adjustment condition is met.

The first adjustment condition may be that the second indication signal has not arrived. If it is determined that the second indication signal has not arrived, step 102 is performed; and if it is determined that the second indication signal has arrived, step 104 is performed.

Step 102: If the status of the second indication signal meets the first adjustment condition, compare power of a received signal with threshold power.

Step 103: If the power of the received signal is greater than the threshold power, compensate the received signal according to a first adjustment factor.

If the power of the received signal is less than or equal to the threshold power, return to step 101 to determine whether the status of the second indication signal meets the first adjustment condition.

Step 104: If the status of the second indication signal does not meet the first adjustment condition, determine whether the status of the second indication signal meets a second adjustment condition.

Step 105: If the status of the second indication signal meets the second adjustment condition, perform auxiliary compensation according to a second adjustment factor.

According to the multi-channel array distortion compensation method provided in this embodiment, whether to trigger a signal compensation operation is determined according to a status of a first indication signal; if it is determined to trigger the signal compensation operation, whether a first adjustment condition is met is determined according to a status of a second indication signal, if the first adjustment condition is met, power of a received signal is compared with threshold power, and if the power of the received signal is greater than the threshold power, the received signal is compensated according to a first adjustment factor and otherwise an indication signal is waited for; and if the status of the second indication signal does not meet the first adjustment condition, whether the status of the second indication signal meets a second adjustment condition is determined, and if the status of the second indication signal meets the second adjustment condition, auxiliary compensation is performed according to a second adjustment factor. It is implemented by compensating a received signal that a system only needs to select and use the most common linear interpolation and amplitude interpolation algorithms to compensate signal distortion caused by chip stacking, without the need to increase complexity of a phase noise immunity algorithm, which reduces costs for implementing a multi-channel array system.

Further, a feasible implementation manner of step 100 in FIG. 5 may be:

Step 100a: Determine whether the status of the first indication signal is greater than 0, and if the status of the first indication signal is greater than 0, trigger the signal compensation operation, that is, trigger execution of step 101.

Further, a feasible implementation manner of the determining, according to a status of a second indication signal, whether a first adjustment condition is met in step 101 in FIG. 5 may be:

Step 101a: Check the status of the second indication signal, where if the second indication signal is not received, the first adjustment condition is met.

Further, a feasible implementation manner of step 102 in FIG. 5 may be:

Step 102a: Set a period and the threshold power according to a modulation manner and a variable gain amplifier (Variable Gain Amplifier, VGA for short) property.

The multi-channel array distortion compensation apparatus can set different power adjustment thresholds according to different modulation manners and VGA properties. For example, the threshold power is relational to a quantity of ADC bits and a peak-to-average ratio of a modulated signal. A calculation method is as follows: assuming that the ADC has 9 bits, with 1 symbol bit, 2 integer bits, and 6 decimal bits, then a range of values that the ADC can represent is −3.9375 to 3.9375. A peak-to-average ratio of 16QAM is 6.1 dB. With a margin of 2 dB considered, a power threshold value is obtained by decreasing maximum power that the ADC represents by 8.1 dB. $10 \lg(3.9375^2/x)=8.1$, where $x=2.4013$.

Step 102b: Measure the power of the received signal according to the period, determine whether the power of the received signal is greater than the threshold power, and if yes, multiply the received signal by the first adjustment factor.

Further, a feasible implementation manner of step 103 in FIG. 5 may be:

Step 103a: If the status of the second indication signal meets the second adjustment condition, search for a pilot location according to the second indication signal and select a pilot signal for periodical power measurement, with a power measure denoted by P1, and measure power of a local pilot signal periodically, with a power measure denoted by P2.

Step 103b: Compensate the received signal according to the second adjustment factor.

Specifically, processing at this phase is performed only at a pilot location of each frame, and in other time, the adjustment factor is not updated but stays the same as the previous value.

It should be noted that, it may be known from step 103a, after the receive end is enabled to receive data, the second adjustment factor may be adjusted continuously according to the pilot signal and the local pilot signal. Therefore, compensating the received signal according to the second adjustment factor can be finer than that according to the fixed first adjustment factor.

Specifically, the second adjustment factor is obtained by using the following formula:

$$\beta = \frac{1}{\sqrt{P1/(P2 \times P)}},$$

where

β is the second adjustment factor, and P is the threshold power.

It should be noted that, referring to FIG. 4, local pilot data is inserted into transmit data periodically with an insertion period varying with the system, and quantity of inserted pieces of local pilot data is set according to system needs. The local pilot data goes through a same channel as the transmit data, and a signal inserted at a pilot location is known. Therefore, in this embodiment, the known signal inserted at the pilot location is named a local pilot signal. After the transmit data is transmitted through a channel, the pilot location data may change. As a result, a signal at the pilot location after channel transmission is unknown. Therefore, in this embodiment, a signal at the pilot location of received data is named a pilot signal. The pilot signal (the signal received at the pilot location) and the local pilot signal may be used to estimate the second adjustment factor for compensating data information. Because pilot insertion is periodical, processes of step 103a and step 103b are also performed periodically. However, it should be noted that, a period of pilot data insertion is different from a period of compensation according to the second adjustment factor, where the period of step 103a and step 103b need to be set according to system needs.

Further, the foregoing first indication signal may be a Reset_ID signal fed back by a digital end. The Reset_ID signal has the following characteristics: the Reset_ID signal is generated by a system timing control module for a purpose of controlling when to enable the receive end, which may be also understood as an on flag signal, where the receive end is generally enabled in advance in a time division duplex (TDD) system; a status of the Reset_ID signal is 0 or 1; the status of the Reset_ID signal being equal to 1 indicates that the receive end has started to receive data. The second indication signal may be an automatic flow word (AFW)_ID signal fed back by the digital end. The AFW_ID signal has the following characteristics: the AFW_ID signal is generated by a frame synchronization module for a purpose of indicating a quantity of remaining subframes in a current frame, which may be understood as a flow identifier. In a TDD system, the AFW_ID signal has two meanings: a flag that the system has completed synchronization estimation, and flow control. In an frequency division duplex (FDD) system, the AFW has only one meaning: a flag that the system has completed synchronization estimation.

The multi-channel array distortion compensation apparatus may use the reset_ID signal and the AFW_ID signal fed back by the digital end for coarse adjustment or fine adjustment. When the reset_ID signal is 1, it indicates that the receive end has started to receive wanted data, and the AFW_ID signal indicates that the frame synchronization module has completed a frame synchronization operation. Moreover, the AFW_ID signal updates information according to a status of the frame synchronization module. For example, the AFW_ID signal being greater than 0 for the first time indicates that the frame synchronization module has just implemented frame synchronization. When the status of the reset_ID signal is greater than 0, the reset_ID signal indicates that the receive end has started to be enabled to send and receive wanted data; and the AFW_ID signal indicates that the frame synchronization module has completed a frame synchronization operation. Certainly, another indication signal may also control the multi-channel array distortion compensation apparatus to perform coarse adjustment or fine adjustment. The embodiment of the present invention does not limit which feedback indication signals can control the multi-channel array distortion compensation apparatus to perform compensation processing.

Further, in a TDD mode, data is sent and received at a same frequency band, and data sending or data receiving is controlled according to different time. In this case, the AFW_ID signal has two meanings: a frame synchronization flag and a flow control table identifier. The status of the AFW_ID presents a quantity of remaining subframes in a current frame structure. The status of the AFW_ID signal is so determined: being greater than 0 indicates that the receive end has completed a frame synchronization process and the multi-channel array distortion compensation apparatus is controlled to enter fine adjustment; AFW_ID=1 indicates that only the last subframe has remained in the current frame structure and the multi-channel array distortion compensation apparatus is controlled to stop adjustment. In an FDD mode, data is sent and received at different frequency bands, where the transmit end always sends data and the receive end always receives data, without interfering with each other. In this case, the AFW_ID is only a flag used to indicate frame synchronization, and the AFW_ID signal is used to control the multi-channel array distortion compensation apparatus to enter fine adjustment. Therefore, the AFW_ID signal is different for the TDD mode and the FDD mode, and whether a mode is TDD or FDD needs to be considered before the solution is specifically implemented.

For the TDD mode, the signal status may be divided into three phases: status 1: whether a wanted signal has arrived is determined by using the reset_ID signal; status 2: the AFW_ID signal is greater than 0 and not 1; and status 3: the AFW_ID signal is 1.

For the FDD mode, the signal status may be divided into two phases: status 1: whether a wanted signal has arrived is determined by using the reset_ID signal; and status 2: the AFW_ID signal is greater than 0, where whether the AFW_ID is 1 does not need to be determined.

In both the TDD mode and the FDD mode, the receive end receives some unwanted data at the beginning, and needs to wait for arrival of the wanted signal at the first phase. The TDD mode is used as an example for description. After the wanted signal arrives, the receive end starts coarse adjustment to compensate the received signal, and continues to determine the signal status, and when status 2 occurs, switches to fine adjustment to compensate the received signal until status 3 occurs, and starts the adjustment again when a next frame arrives.

With reference to the steps shown in FIG. 5 and the corresponding embodiment, the foregoing second adjustment condition is different for the TDD mode and the FDD mode. For the TDD mode, the second adjustment condition is that the status of the second indication signal is greater than 0 and not equal to 1.

For the FDD mode, the second adjustment condition is that the status of the second indication signal is greater than 0.

Further, in the TDD mode, after compensating the received signal according to the second adjustment factor, the method further includes:

Determining whether the status of the second indication signal is 1, and if yes, stopping compensation, until a next time when the status of the second indication signal is greater than 0.

The distortion compensation method according to this embodiment is described by using an example that the first indication signal is a reset_ID signal and the second indication signal is an AFW_ID signal.

Figure 6:
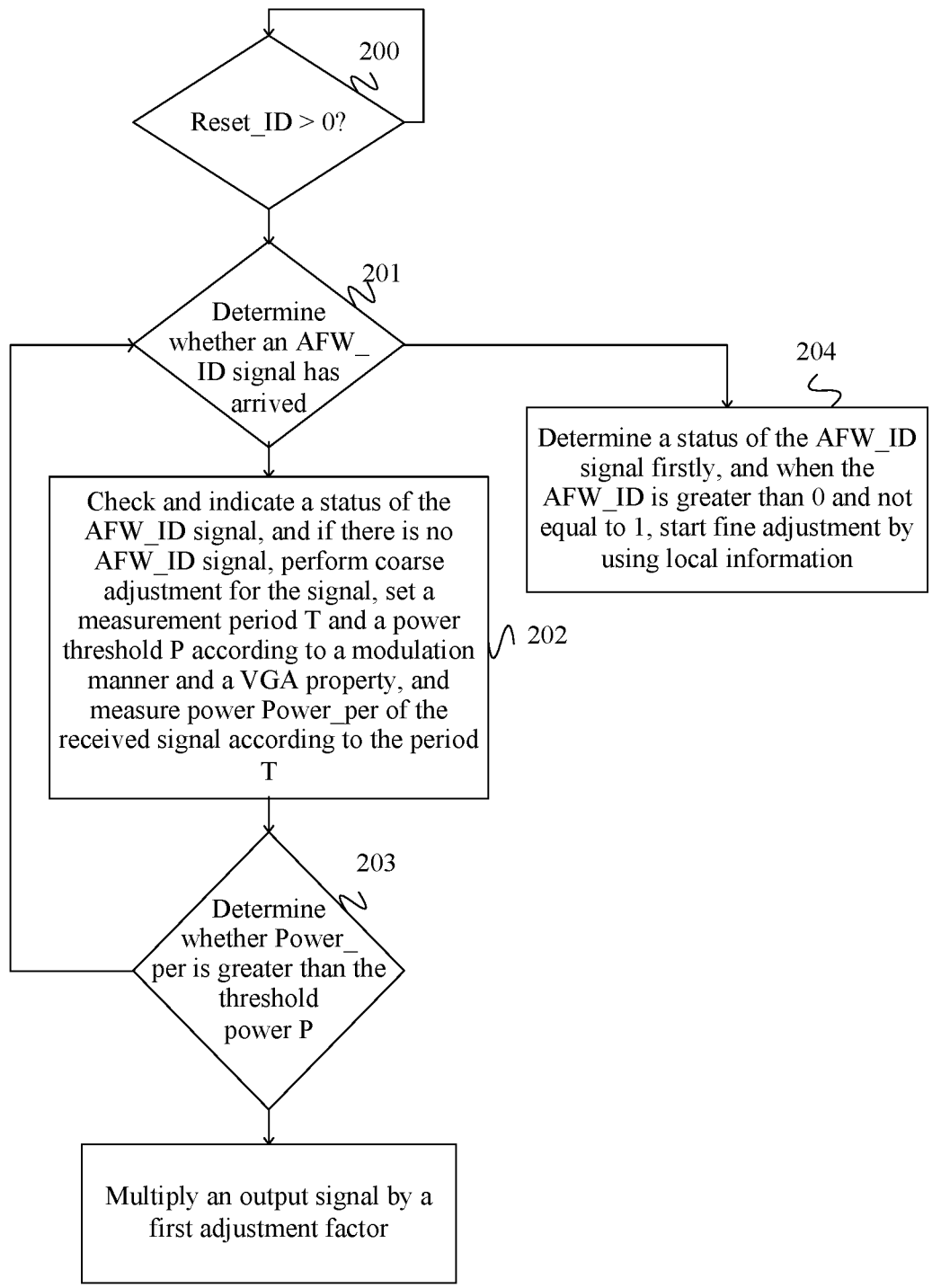
FIG. 6 is a schematic flowchart of another distortion compensation method for a multi-channel array system according to an embodiment of the present invention.

FIG. 6 is a schematic flowchart of another distortion compensation method for a multi-channel array system according to an embodiment of the present invention. Referring to FIG. 6, the method includes the following steps by using the TDD mode as an example:

Step 200: Initial phase: Determine whether a wanted signal has arrived according to whether an indication signal, that is, a reset_ID signal, is greater than 0, and if the wanted signal has arrived, go to the next step and otherwise continue waiting.

Step 201: Determine whether an AFW_ID signal has arrived.

Step 202: Coarse adjustment phase: Check a status of the AFW_ID signal firstly, and if there is no AFW_ID signal, perform coarse adjustment for the signal, set a measurement period T and a power threshold P according to a modulation manner and a VGA property, and measure power Power_per of the received signal according to the period T.

Step 203: Determine whether the power (Power_per) is greater than the threshold power P, if yes, multiply an output signal by a first adjustment factor $\alpha$, and if not, stop processing, and wait for arrival of the AFW_ID signal.

Step 204: Fine adjustment phase: Determine a status of the AFW_ID signal firstly, and when the status of the AFW_ID signal is greater than 0 and not equal to 1, start fine adjustment by using local information.

Figure 7:
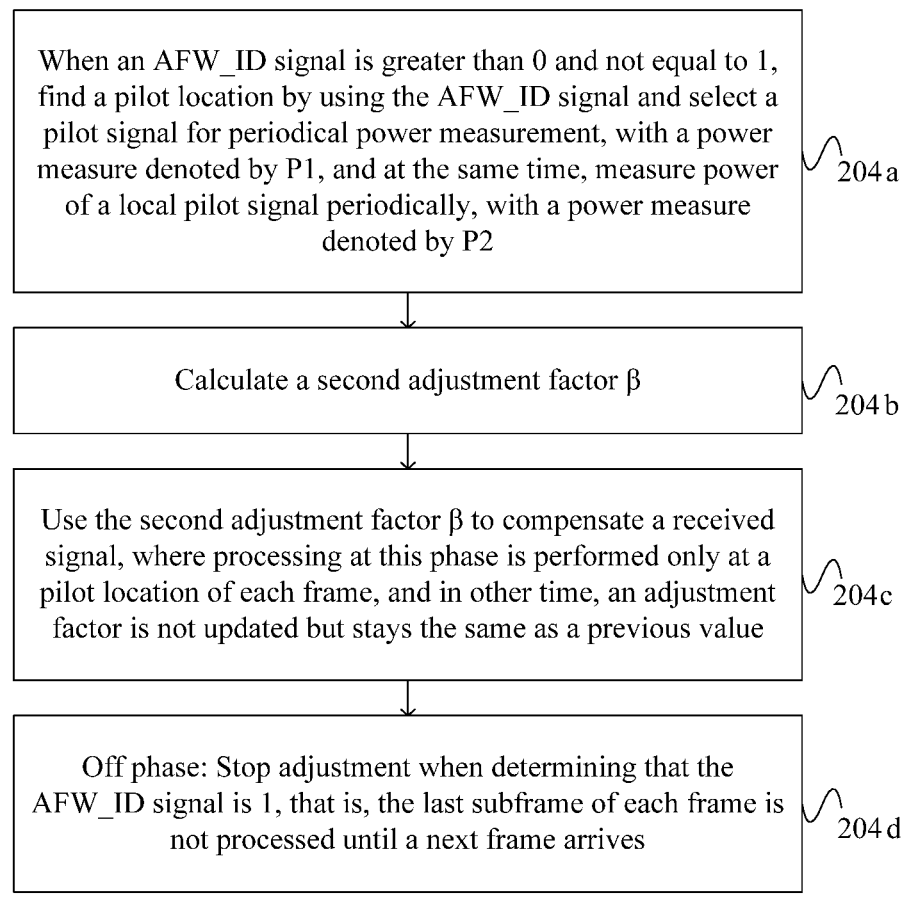
FIG. 7 is a schematic flowchart of another distortion compensation method for a multi-channel array system according to an embodiment of the present invention.

Further, for step 204 in FIG. 6, FIG. 7 is a schematic flowchart of another distortion compensation method for a multi-channel array system according to an embodiment of the present invention. Referring to FIG. 7, a feasible implementation manner of step 204 includes the following steps:

Step 204a: Power measurement: Find a pilot location by using the AFW_ID signal and select a pilot signal for periodical power measurement, with a power measure denoted by P1, and at the same time, measure power of a local pilot signal periodically, with a power measure denoted by P2, where setting of a measurement period is the same as that in step 201.

Step 204b: Calculation of a second adjustment factor β: Calculate the second adjustment factor according to values of P1 and P2 by using the following formula:

$$\beta = \frac{1}{\sqrt{P1/(P2 \times P)}}.$$

Step 204c: Use the second adjustment factor β to compensate the received signal, where processing at this phase is only performed at a pilot location of each frame, and in other time, the adjustment factor is not updated but stays the same as the previous value.

Step 204d: Off phase: Stop adjustment when determining that the AFW_ID signal is 1, that is, the last subframe of each frame is not processed until a next frame arrives.

Specifically, if the AFW_ID signal is not 1, return to step 204a to repeat step 204a to step 204d. It should be noted that step 204d is not needed in the FDD mode.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a read only memory (ROM), a read access memory (RAM), a magnetic disk, or an optical disc.

Finally, it should be noted that the foregoing embodiments are merely intended to describe the technical solutions of the present invention, but not to limit the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A multi-channel array distortion compensation apparatus, comprising:
   a processor; and
   a non-transitory computer readable medium connected to the processor, and having stored thereon instructions that, when executed, cause the processor to:
   determine, according to a status of a first indication signal, whether to trigger a signal compensation operation;
   determine, according to a status of a second indication signal, whether a first adjustment condition is met; and
   if the first adjustment condition is met, compare power of a received signal with a power threshold; and
   if the power of the received signal is greater than the power threshold, compensate the received signal according to a first adjustment factor; wherein
   if the status of the second indication signal does not meet the first adjustment condition, determine the status of the second indication signal meets a second adjustment condition, compensate the received signal according to a second adjustment factor.

2. The apparatus according to claim 1, wherein the processor is configured to:
   determine the status of the first indication signal is greater than 0, then trigger the signal compensation operation;
   check the status of the second indication signal, wherein if the second indication signal is not received, the first adjustment condition is met;
   set a period and the power threshold according to a modulation manner and a variable gain amplifier (VGA) property;
   measure the power of the received signal according to the period and determine the power of the received signal is greater than the power threshold;
   multiply the received signal by the first adjustment factor; and
   if the status of the second indication signal meets the second adjustment condition, search for a pilot location according to the second indication signal and select a pilot signal for periodical power measurement, with a power measure denoted by P1, measure power of a local pilot signal periodically, with a power measure denoted by P2, and compensate the received signal according to the second adjustment factor; wherein
   the second adjustment factor is obtained by using the following formula:

$$\beta = \frac{1}{\sqrt{P1/(P2 \times P)}},$$

wherein
β is the second adjustment factor, and P is the power threshold, wherein P1, P2, and P are positive, non-zero real numbers.

3. The apparatus according to claim 2, wherein the second adjustment condition is that the status of the second indication signal is greater than 0 and not equal to 1; or
the second adjustment condition is that the status of the second indication signal is greater than 0.

4. The apparatus according to claim 3, wherein the processor is further configured to:
   when the second adjustment condition is that the status of the second indication signal is greater than 0 and not equal to 1, determine, after a compensation module compensates the received signal according to the second adjustment factor, the status of the second indication signal is 1, stop compensation, until a next time when the status of the second indication signal is greater than 0.

5. A multi-channel array distortion compensation method, comprising:
   determining, according to a status of a first indication signal, whether to trigger a signal compensation operation;
   determining, according to a status of a second indication signal, whether a first adjustment condition is met,
   comparing power of a received signal with a power threshold, and if the power of the received signal is greater than the power threshold, compensating the received signal according to a first adjustment factor; and if the status of the second indication signal does not meet the first adjustment condition, determining the status of the second indication signal meets a second adjustment condition, compensating the received signal according to a second adjustment factor.

6. The method according to claim 5, wherein the determining, according to the status of the first indication signal, whether to trigger a signal compensation operation comprises:

determining the status of the first indication signal is greater than 0, then triggering the signal compensation operation;

the determining, according to a status of a second indication signal, a first adjustment condition is met comprises:

checking the status of the second indication signal, wherein if the second indication signal is not received, the first adjustment condition is met;

the comparing power of a received signal with power threshold, and if the power of the received signal is greater than the power threshold, compensating the received signal according to a first adjustment factor comprises:

setting a period and the power threshold according to a modulation manner and a variable gain amplifier (VGA) property; and measuring the power of the received signal according to the period, determining the power of the received signal is greater than the power threshold, multiplying the received signal by the first adjustment factor; and the determining the status of the second indication signal meets a second adjustment condition, compensating the received signal according to a second adjustment factor comprises:

if the status of the second indication signal meets the second adjustment condition, searching for a pilot location according to the second indication signal and selecting a pilot signal for periodical power measurement, with a power measure denoted by P1, measuring power of a local pilot signal periodically, with a power measure denoted by P2, and compensating the received signal according to the second adjustment factor; wherein the second adjustment factor is obtained by using the following formula:

$$\beta = \frac{1}{\sqrt{P1/(P2 \times P)}},$$

wherein

β is the second adjustment factor, and P is the power threshold, wherein P1, P2, and P are positive, non-zero real numbers.

7. The method according to claim 6, wherein the second adjustment condition is that the status of the second indication signal is greater than 0 and not equal to 1; or the second adjustment condition is that the status of the second indication signal is greater than 0.

8. The method according to claim 7, wherein, when the second adjustment condition is that the status of the second indication signal is greater than 0 and not equal to 1, after the updating a pilot location in each frame of the received signal according to the second adjustment factor, the method further comprises:

determining the status of the second indication signal is 1, stopping compensation, until a next time when the status of the second indication signal is greater than 0.

* * * * *